US012633514B2

(12) United States Patent
Lee et al.

(10) Patent No.: US 12,633,514 B2
(45) Date of Patent: May 19, 2026

(54) ELECTRODE MANUFACTURING METHOD AND ELECTRODE MANUFACTURING SYSTEM USED IN METHOD

(71) Applicant: LG Energy Solution, Ltd., Seoul (KR)

(72) Inventors: Seo Jun Lee, Daejeon (KR); Hyojin Lee, Daejeon (KR); Tae Su Kim, Daejeon (KR); Hyuk Soo Lee, Daejeon (KR); Jung Hyun Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 709 days.

(21) Appl. No.: 18/030,357

(22) PCT Filed: Jul. 18, 2022

(86) PCT No.: PCT/KR2022/010450
§ 371 (c)(1),
(2) Date: Apr. 5, 2023

(87) PCT Pub. No.: WO2023/003300
PCT Pub. Date: Jan. 26, 2023

(65) Prior Publication Data
US 2023/0378425 A1 Nov. 23, 2023

(30) Foreign Application Priority Data

Jul. 21, 2021 (KR) ........................ 10-2021-0095769

(51) Int. Cl.
*H01M 4/04* (2006.01)
*B23K 26/08* (2014.01)
(Continued)

(52) U.S. Cl.
CPC ......... *H01M 4/0471* (2013.01); *B23K 26/083* (2013.01); *B23K 26/362* (2013.01);
(Continued)

(58) Field of Classification Search
CPC .... H01M 4/04; H01M 4/0404; H01M 4/0471; H01M 4/4139; H01M 4/1391; B23K 26/083; B23K 26/362
See application file for complete search history.

(56) References Cited

U.S. PATENT DOCUMENTS

2013/0309566 A1 11/2013 Umehara
2014/0255788 A1 9/2014 Seki et al.
2016/0013469 A1 1/2016 Tajima et al.
(Continued)

FOREIGN PATENT DOCUMENTS

JP H03180286 A 8/1991
JP H07135023 A 5/1995
(Continued)

OTHER PUBLICATIONS

International Search Report for PCT/KR2022/010450 mailed Oct. 26, 2022. 3 pages.

*Primary Examiner* — Michael Leslie
(74) *Attorney, Agent, or Firm* — Lerner David LLP

(57) ABSTRACT

A method for manufacturing an electrode includes the steps of (a) laminating an active material layer on the surface of the current collector; and (b) removing a portion of the active material layer by irradiating a laser beam on the surface of the active material layer. Before irradiating the active material layer with a laser beam in step (b), a process of supplying moisture to the active material layer is performed. A system for manufacturing an electrode according to the above method is also provided.

14 Claims, 3 Drawing Sheets

(51) Int. Cl.
    *B23K 26/362*     (2014.01)
    *H01M 4/1391*     (2010.01)

(52) U.S. Cl.
    CPC .......... *H01M 4/04* (2013.01); *H01M 4/0404*
        (2013.01); *H01M 4/1391* (2013.01)

(56)       References Cited

U.S. PATENT DOCUMENTS

| | | | |
|---|---|---|---|
| 2016/0036009 A1 | 2/2016 | Cho et al. | |
| 2017/0309475 A1 | 10/2017 | Kim et al. | |
| 2019/0267608 A1 | 8/2019 | Choi et al. | |
| 2022/0085359 A1* | 3/2022 | Kubo | ............... H01M 10/0525 |
| 2022/0371127 A1 | 11/2022 | Ko et al. | |
| 2022/0376226 A1* | 11/2022 | Herle | ................ B23K 26/0846 |

FOREIGN PATENT DOCUMENTS

| | | |
|---|---|---|
| JP | H11054106 A | 2/1999 |
| JP | 2000149911 A | 5/2000 |
| JP | 2000251942 A | 9/2000 |
| JP | 2002289180 A | 10/2002 |
| JP | 2008140885 A | 6/2008 |
| JP | 2015000426 A | 1/2015 |
| JP | 2016033912 A | 3/2016 |
| JP | 2016066594 A | 4/2016 |
| JP | 2018081858 A | 5/2018 |
| JP | 2019091793 A | 6/2019 |
| KR | 20120117636 A | 10/2012 |
| KR | 20140051319 A | 4/2014 |
| KR | 20150088905 A | 8/2015 |
| KR | 20150122940 A | 11/2015 |
| KR | 20160131607 A | 11/2016 |
| KR | 101738776 B1 | 5/2017 |
| KR | 20170057953 A | 5/2017 |
| KR | 20170068064 A | 6/2017 |
| KR | 20170115897 A | 10/2017 |
| KR | 20180001229 A | 1/2018 |
| KR | 20200041132 A | 4/2020 |
| KR | 20210048702 A | 5/2021 |

* cited by examiner

【Figure 1】
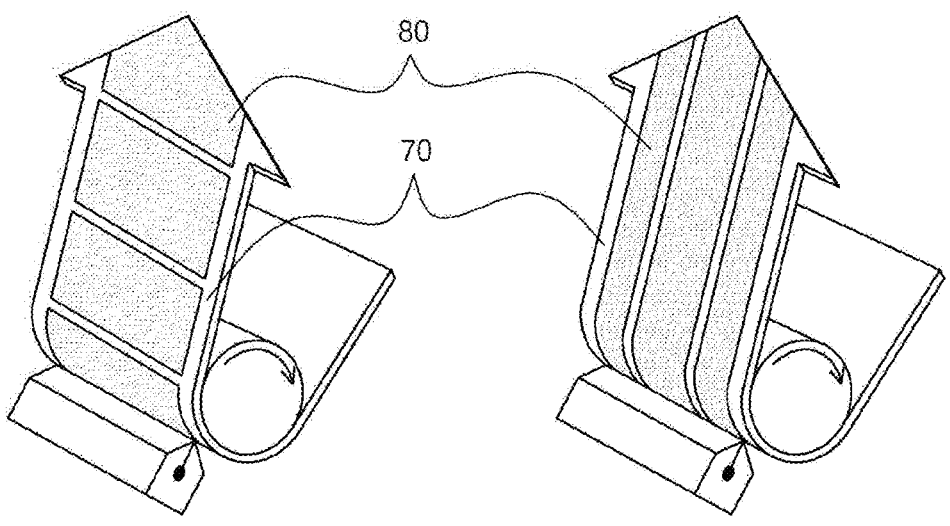
【Figure 2】
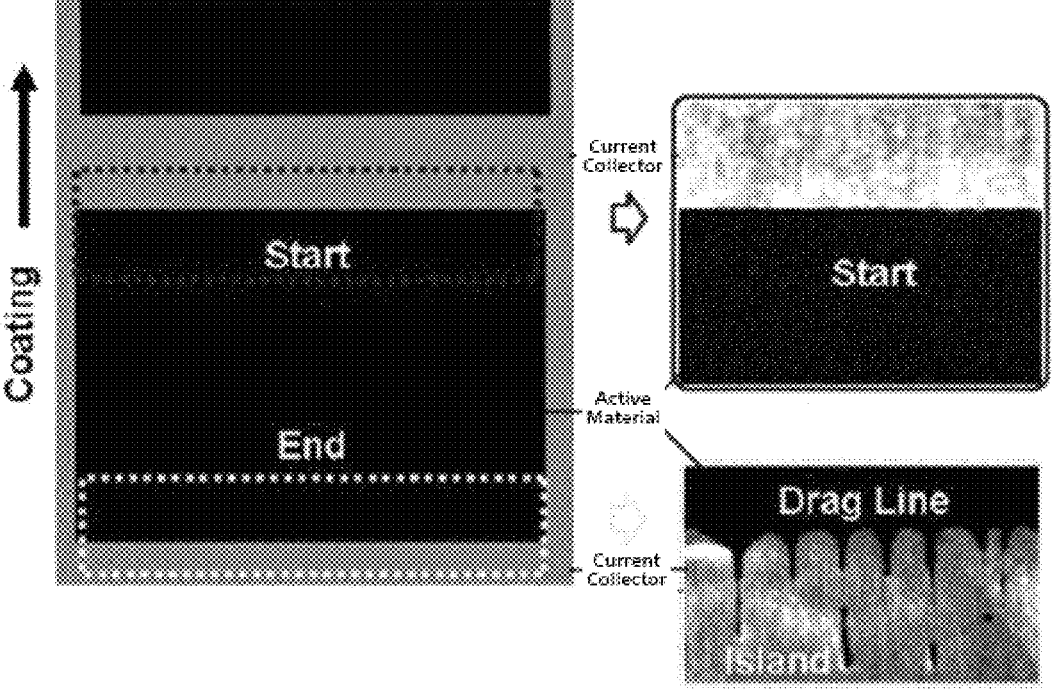

【Figure 3】
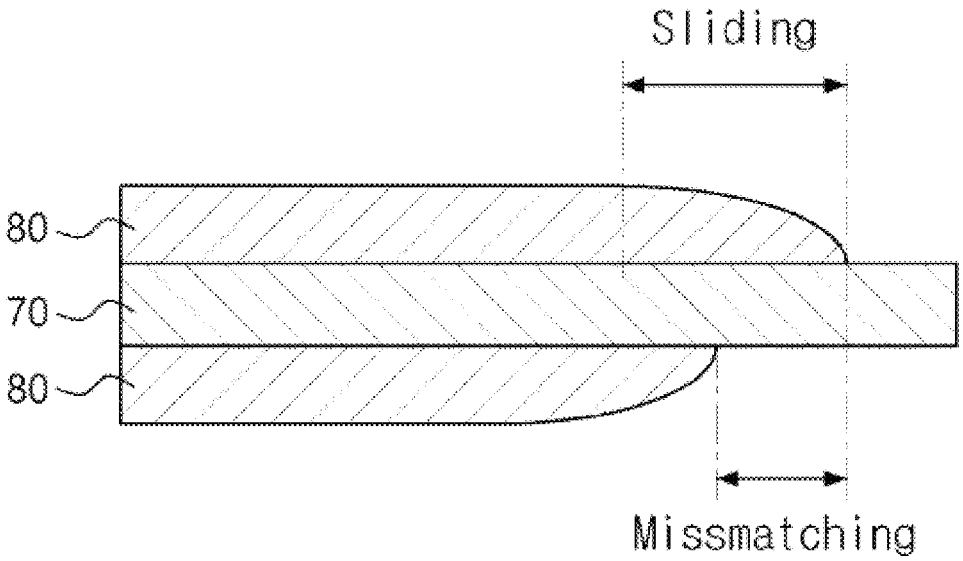
【Figure 4】
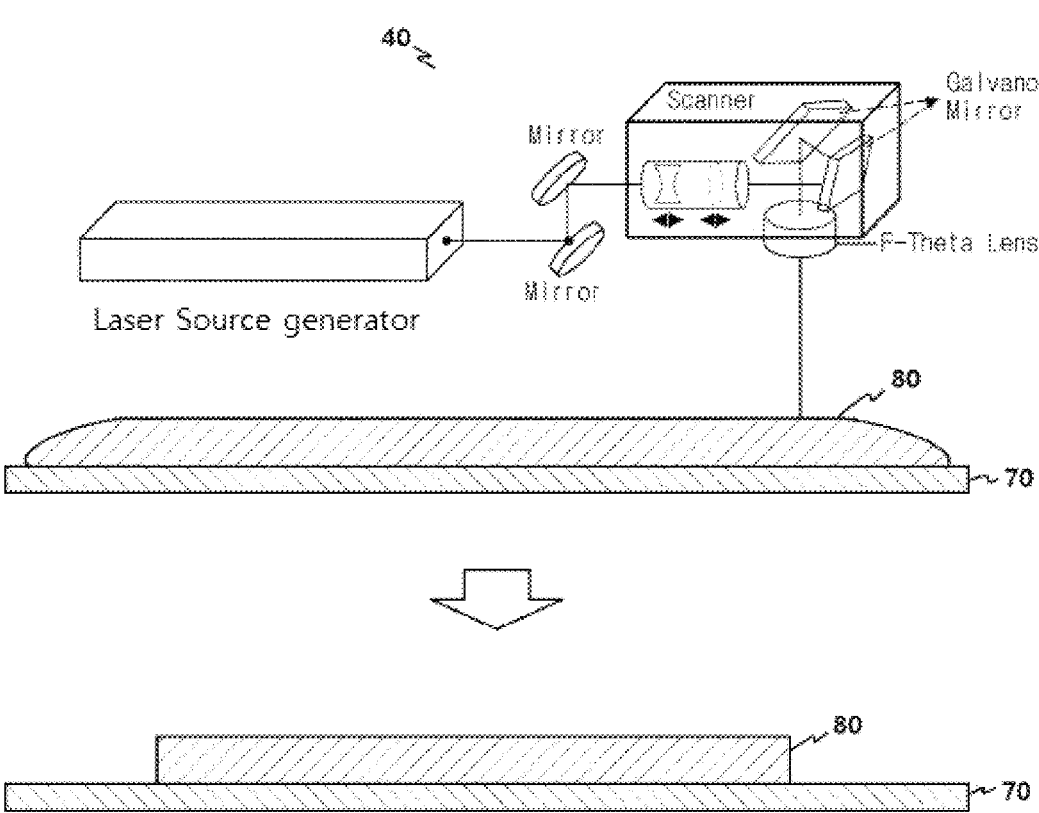

【Figure 5】
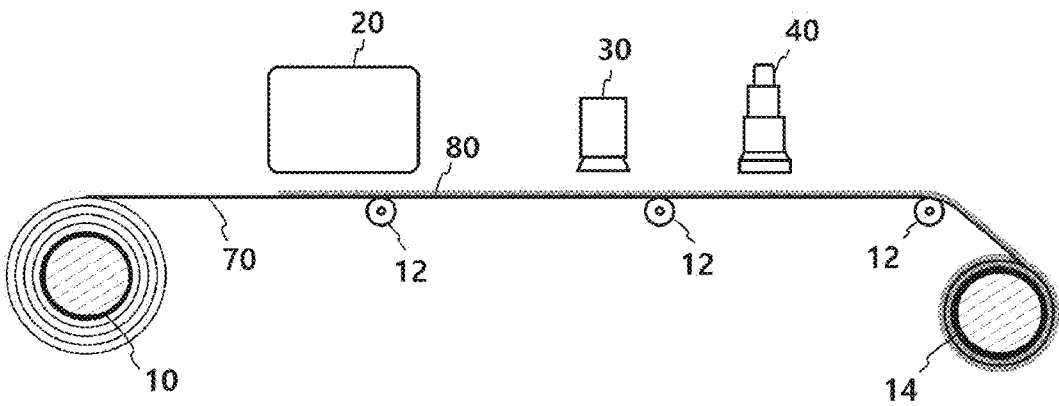
【Figure 6】
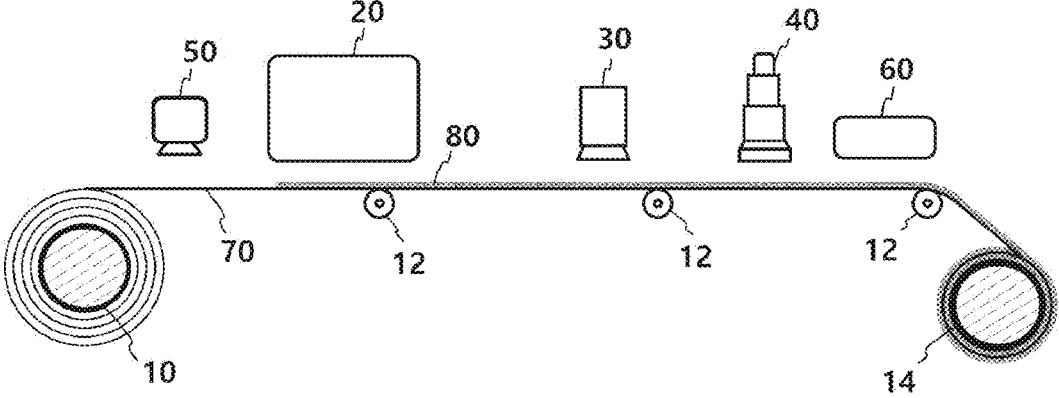

ELECTRODE MANUFACTURING METHOD AND ELECTRODE MANUFACTURING SYSTEM USED IN METHOD

CROSS-REFERENCE TO RELATED APPLICATIONS

The present application is a national phase entry under 35 U.S.C. § 371 of International Application No. PCT/KR2022/010450 filed on Jul. 18, 2022 which claims priority from Korean Patent Application No. 10-2021-0095769 filed on Jul. 21, 2021, all of which are incorporated herein by reference.

TECHNICAL FIELD

The present invention relates to a method of manufacturing an electrode and an electrode manufacturing system used in the method described above.

BACKGROUND ART

As the demand for mobile devices and electric vehicles increases, the demand for secondary batteries is rapidly increasing. In particular, a lithium secondary battery having a high energy density and voltage among secondary batteries has been commercialized and widely used.

The lithium secondary battery has a structure in which an electrolyte containing lithium salt is impregnated into an electrode with an active material applied on a current collector, that is, an electrode assembly with a porous separator between the positive electrode and the negative electrode. The electrode is manufactured by forming an active material layer on a current collector through a mixing process of preparing a slurry by mixing/dispersing an active material, a binder, and an electrically conductive material in a solvent, a coating process of applying the active material slurry to a thin-film current collector and drying it, and a pressing process to increase the capacity density of the electrode after the coating process and to increase the adhesive property between the current collector and the active material.

When the active material slurry is applied to the current collector, it is known that it is difficult to form a uniform surface at the distal end of the active material layer due to the formation of drag lines and/or islands, as shown in FIG. 2. In addition, at the edge of the active material layer, a sliding part in which the thickness of the active material layer gradually decreases is formed, thereby causing a problem of reducing the capacity of the active material layer, as shown in FIG. 3. In addition, when applying the slurry to both surfaces of the current collector, mismatching occurs where the positions of the slurry applied to the upper and lower surfaces do not match, as shown in FIG. 3. This mismatching causes the position of the active material layer to be misaligned when the positive/negative electrodes face each other, and this misaligned portion reduces the charging/discharging efficiency. In particular, the mismatching portion may cause lithium to be deposited on the surface of the negative electrode, and when such lithium deposition is performed for a long time, the capacity of the battery is reduced.

Meanwhile, in order to solve the above problems, a laser etching method has been introduced, but in the case of this method, there was a problem that the active material is deteriorated (heat affected zone) by the heat of the laser beam.

Therefore, there is a need for a method capable of uniformly forming an end of the active material layer, preventing the formation of a sliding portion and/or mismatching portion, and preventing deterioration of the active material.

DISCLOSURE

Technical Problem

It is an object of the present invention to provide an electrode manufacturing method and an electrode manufacturing system capable of uniformly forming an end of an active material layer without a sliding portion and/or a mismatching portion by laser etching, which have been devised to solve the above problems of the prior art.

It is another object of the present invention to provide an electrode manufacturing method and an electrode manufacturing system capable of preventing a problem (generation of a heat affected zone) in which an active material is deteriorated by heat of a laser beam during laser etching.

Technical Solution

In order to achieve the above objects, the present invention provides a method for manufacturing an electrode comprising the steps of, (a) laminating an active material layer on the surface of the current collector; and (b) removing a portion of the active material layer by irradiating a laser beam on the surface of the active material layer, wherein before irradiating the laser beam to the active material layer in step (b), a process of supplying moisture to the active material layer is performed.

In addition, the present invention provides a system for manufacturing an electrode comprising, a current collector supply device that supplies the current collector in a flat shape;

an active material coating device for coating an active material on the surface of the supplied current collector;

a moisture supply device for supplying moisture to the active material layer laminated by the active material coating device; and a laser etching device for etching a portion of the active material layer to which the moisture is supplied.

Advantageous Effects

The electrode manufacturing method and electrode manufacturing system of the present invention provides an effect of uniformly forming an end of an active material layer without a sliding portion and/or a mismatching portion by using a laser etching method.

In addition, the present invention provides an effect of minimizing the deterioration (Heat affected zone) of the active material due to the heat of the laser beam by supplying moisture during laser etching.

DESCRIPTION OF DRAWINGS

FIG. 1 is a diagram schematically showing the active material coating process during the electrode manufacturing process of the prior art.

FIG. 2 is a diagram showing a problem that occurs when applying an active material to a current collector according to the prior art.

FIG. 3 is a diagram schematically showing a sliding portion and a mismatching portion that occur when an active material is applied to a current collector according to the prior art.

FIG. 4 is a diagram schematically illustrating a laser etching process according to an embodiment of the present invention.

FIG. 5 and FIG. 6 are diagrams schematically illustrating electrode manufacturing systems according to an embodiment of the present invention, respectively.

BEST MODE

Hereinafter, embodiments of the present invention will be described in detail with reference to the accompanying drawings so that those of ordinary skill in the art to which the present invention pertains can easily carry out the present invention. However, the present invention may be embodied in various different forms and is not limited to the embodiments described herein. Throughout the specification, like reference numerals are assigned to similar parts.

It should be understood that when any component is referred to as "connected to, provided with, or installed to" another component, although it may be directly connected or installed to the other component, other components may exist in therebetween. On the other hand, it should be understood that when any component is referred to as "directly connected to, provided with, or installed to" another component, the other component does not exist in the middle. Meanwhile, other expressions describing the relationship between the elements, i.e., "on" and "directly on" or "between" and "immediately between" or "neighboring to" and "directly neighboring to" should be interpreted likewise.

FIG. 4 is a diagram schematically illustrating a laser etching process according to an embodiment of the present invention, and FIG. 5 and FIG. 6 exemplarily show electrode manufacturing systems for manufacturing an electrode by a roll-to-roll process as an embodiment of the method for manufacturing an electrode of the present invention. Hereinafter, the present invention will be described with reference to the drawings.

The method of manufacturing the electrode of the present invention comprises, as shown in FIG. 5, the steps of, (a) laminating an active material layer 80 on the surface of the current collector 70; and (b) removing a portion of the active material layer by irradiating 40 (using a laser etching device) a laser beam on the surface of the active material layer 80, wherein before irradiating the laser beam to the active material layer in step (b), the process of supplying 30 (using a moisture supply device) moisture to the active material layer is performed.

Even in the conventional electrode manufacturing method, a laser etching device is used, but there is a problem that the active material is deteriorated (heat affected zone) by the heat of the laser beam. The present invention is characterized in that the above problems are solved by a method of supplying moisture to the active material layer before irradiation with a laser beam.

When the active material is deteriorated by the heat of the laser beam, oxidation and subsequent discoloration of the surface of the electrode foil may occur. In one embodiment of the present invention, the supply of moisture in step (b)

may be performed in such a way that moisture permeates into the active material layer before the laser beam is irradiated. For example, the supply of the moisture may be made 5 seconds to 30 seconds before the application of the laser. This is because sufficient time is required for moisture to be supplied into the active material before application of the laser. However, it is not limited to the above range because the time required for water absorption varies depending on the composition of the active material and the amount of the layered active material.

The method of supplying the moisture is not particularly limited, but may be performed, for example, by a spray method. However, the present invention is not limited thereto, and any method may be employed as long as it is a method capable of sufficiently supplying moisture to the active material.

In one embodiment of the present invention, the laser beam may have a rectangular shape or a linear shape of a horizontal cross section of the beam. The horizontal direction refers to a direction based on a vertical direction in which the laser is irradiated.

In one embodiment of the present invention, as the laser etching device used in the above-described method, a laser etching device known in the art may be used. The laser etching device may include a laser source generator, a delivery mirror, a laser beam width adjuster, and a scanner unit, and the like, as shown in FIG. 4, and the scanner unit may include a Galvano mirror, theta lens, and the like. The laser source generator may be, for example, a laser source generator that generates a region of an IR (Infrared Radiation) wavelength, and the wavelength of the laser may be 700 nm to 1100 nm, preferably 1000 nm to 1100 nm, but is not limited thereto.

In general, the laser is oscillated in a circular (Gaussian) shape, but it can be oscillated in a rectangular (Top HAT) or linear beam shape depending on the configuration of the optical system. For example, in the case of a circular or square beam, it can be formed using a mirror that can move the X-Y axes, respectively, like a laser scanner. That is, it is possible to form a beam of a desired shape by the movement of the two mirrors.

The rectangular beam can etch a large amount faster than the circular beam. In addition, the active material layer can be etched more precisely in the case of a linear beam than in a circular beam in which the intensity distribution of the beam is concentrated in the center.

In one embodiment of the present invention, the step of laminating the active material layer of step (a) may be made by coating the active material, and it is also possible to additionally perform a drying process, a pressing process, and the like. In the present invention, step (b) may be made after coating of the active material, preferably after the pressing process. Specifically, step (b) may be performed in a notching process after the pressing process.

In one embodiment of the present invention, the portion from which the active material layer is partially removed in step (b) may form an active material-non-coated portion. Specifically, the step (b) may be a process of forming an active material-non-coated portion and the process may be performed by partially removing the active material from the current collector coated with the active material with a laser beam, and the active material-non-coated portion may then be formed into an electrode tab by a process such as punching.

In one embodiment of the present invention, steps (a) and (b) may be performed on one side of the current collector, or may be performed on both the front side and the back side.

In one embodiment of the present invention, steps (a) and (b) may be performed by a process of manufacturing an electrode by a roll-to-roll process, as exemplified in FIGS. 5 and 6.

In one embodiment of the present invention, before step (a), a step of performing corona treatment 50 (using a corona treatment device) on the surface of the current collector on which the active material is to be laminated may be further comprised, as exemplified in FIG. 6, and after step (b), a heat treatment 60 (using a heat treatment device) step for stabilization may be further comprised. The corona treatment on the surface of the current collector is a process for better adhesion of the active material to the surface of the current collector.

The corona treatment and heat treatment may be performed by a method known in the art.

In one embodiment of the present invention, the electrode manufacturing method may be applied to both the positive electrode and the negative electrode. The current collector is a positive electrode current collector or a negative electrode current collector, and current collectors known in this field may be used without limitation, and for example, a foil manufactured by copper, aluminum, gold, nickel, a copper alloy, or a combination thereof may be used.

In addition, the active material layer may be a positive electrode active material layer or a negative electrode active material layer. The active material layer may be formed by a slurry of an active material including a positive electrode active material or a negative electrode active material and a binder, and the slurry of the active material may further comprise an electrically conductive material and, if necessary, may further comprise a dispersant.

As the positive electrode active material, the negative electrode active material, the binder, and the electrically conductive material, components known in the art may be used without limitation.

As the positive electrode active material, for example, lithium manganese oxide, lithium cobalt oxide, lithium nickel oxide, lithium iron oxide, $LiNi_xMn_yCo_zO_2$ (NMC) which is a three-component positive electrode material, or a lithium composite oxide combining these may be used. In the case of a lithium-sulfur battery, a sulfur-carbon composite may be comprised as a positive electrode active material.

Examples of the negative electrode active material may be $LiTi_2(PO_4)_3$, $Li_3V_2(PO_4)_3$, $LiVP_2O_7$, $LiFeP_2O_7$, $LiVPO_4F$, $LiVPO_4O$, and $LiFeSO_4F$. The negative electrode active material may have a carbon coating layer formed on its surface.

As the electrically conductive material, for example, carbon black such as Super-P, Denka black, acetylene black, Ketjen black, channel black, furnace black, lamp black, thermal black, and carbon black; carbon derivatives such as carbon nanotubes and fullerene; electrically conductive fibers such as carbon fiber or metal fiber; metal powders such as carbon fluoride, aluminum and nickel powder; or electrically conductive polymers such as polyaniline, polythiophene, polyacetylene, and polypyrrole may be used.

The electrode manufacturing system according to an embodiment of the present invention comprises, as illustrated in FIG. 5, a current collector supply device 10 for supplying the current collector 70 in a flat form;

an active material coating device 20 for coating an active material on the surface of the supplied current collector;

a moisture supply device 30 for supplying moisture to the active material layer (80) laminated by the active material coating device; and a laser etching device 40 for etching a portion of the active material layer to which the moisture is supplied.

All of the contents described in the above-described method for manufacturing an electrode may be applied to the electrode manufacturing system of the present invention. Therefore, descriptions of some overlapping contents will be omitted.

In one embodiment of the present invention, the current collector supply device 10 is not particularly limited as long as it is a device capable of supplying the coating of the active material on the current collector, and an apparatus known in the art may be used. For example, the device for supplying the current collector to the Roll-to-Roll process may be a roll 10 on which the current collector is wound, as shown in FIG. 5.

In one embodiment of the present invention, as the active material coating device 20, laser etching device 40, and the like, devices known in the art may be used without limitation. Also, although not shown in the drawings, a drying device, a pressing device, and the like may be further comprised.

For example, the laser etching device may include a laser source generator, a delivery mirror, a laser beam width adjuster, and a scanner unit, as shown in FIG. 4, and the scanner unit may comprise a Galvano mirror, theta lens, and the like. The laser source generator may be, for example, an IR laser source generator, and the wavelength of the laser generated by the laser source generator may be 700 nm to 1100 nm, preferably 1000 nm to 1100 nm, but is not limited thereto.

In one embodiment of the present invention, the laser beam irradiated from the laser etching device 40 may have a rectangular shape or a linear shape in a horizontal cross section. The horizontal direction refers to a direction based on a vertical direction in which the laser is irradiated.

In one embodiment of the present invention, the electrode manufacturing system may further include a corona treatment device 50 positioned in front of the active material coating device 10 and a heat treatment device 60 positioned in the rear of the laser etching device 40, as shown in FIG. 6.

As the corona treatment device 50 and the heat treatment device 60, devices known in the art may be used without limitation.

In one embodiment of the present invention, as the moisture supply device 30, a moisture spray device, etc. may be used, but is not limited thereto, and any device may be used as long as such device is capable of providing sufficient moisture to the active material.

Although the present invention has been described in connection with the above-mentioned preferred embodiments, various modifications and variations can be made without departing from the spirit and scope of the invention. Accordingly, the appended claims will cover such modifications and variations as long as they fall within the scope of the present invention.

DESCRIPTION OF SYMBOL

10: UN-Winder Roll
12: Support roll
14: Re-Winder Roll
20: Active material coating device
30: Moisture supply device 40: Laser etching device
50: Corona treatment device
60: Heat treatment device
70: Current collector
80: Active material layer

The invention claimed is:

1. A method for manufacturing an electrode, the method comprising the steps of:

(a) laminating an active material layer on a surface of a current collector;

(b) supplying moisture to the active material layer; and (c) after supplying moisture to the active material layer, removing a portion of the active material layer by irradiating a surface of the active material layer with a laser beam is supplied.

2. The method for manufacturing the electrode according to claim 1, wherein the supply of moisture in step (b) permeates into the active material layer before the active material layer is irradiated by the laser beam.

3. The method for manufacturing the electrode according to claim 2, wherein a spray device supplies the moisture.

4. The method for manufacturing the electrode according to claim 1, wherein the laser beam has a rectangular shape or a linear shape in a horizontal cross section of the laser beam.

5. The method for manufacturing the electrode according to claim 1, wherein the laser beam comprises IR light with a wavelength of 700 nm to 1100 nm.

6. The method for manufacturing the electrode according to claim 1, wherein the step of laminating the active material layer includes coating the surface of the current collector with an active material.

7. The method for manufacturing the electrode according to claim 1, wherein a portion of the surface of the current collector from which the portion of the active material layer is partially removed in step (c) forms an active material-non-coated portion.

8. The method for manufacturing the electrode according to claim 1, wherein steps (a), (b), and (c) are performed on both a first surface and an opposing second surface of the current collector.

9. The method for manufacturing the electrode according to claim 1, wherein steps (a), (b), and (c) are performed in a roll-to-roll process.

10. The method for manufacturing the electrode according to claim 1, further comprising a step of performing a corona treatment on the surface of the current collector before step (a), and further comprising a step of heat-treating the active material layer after step (c).

11. A system for manufacturing an electrode comprising, a current collector supply device configured to supply the current collector in a flat shape;

an active material coating device configured to coat an active material on a surface of the current collector to define an active material layer;

a moisture supply device configured to supply moisture to the active material layer; and a laser etching device configured to etch a portion of the active material layer to which the moisture is supplied.

12. The system for manufacturing the electrode according to claim 11, further comprising a corona treatment device positioned prior to the coating device and a heat treatment device positioned after the laser etching device.

13. The system for manufacturing the electrode according to claim 11, wherein the moisture supply device is a moisture injection device.

14. The system for manufacturing the electrode according to claim 11, wherein the current collector supply device is a roll-to-roll device.

* * * * *